Dec. 13, 1932.  A. E. YOUNG  1,891,035
MEASURING APPARATUS
Filed May 6, 1930  4 Sheets-Sheet 1
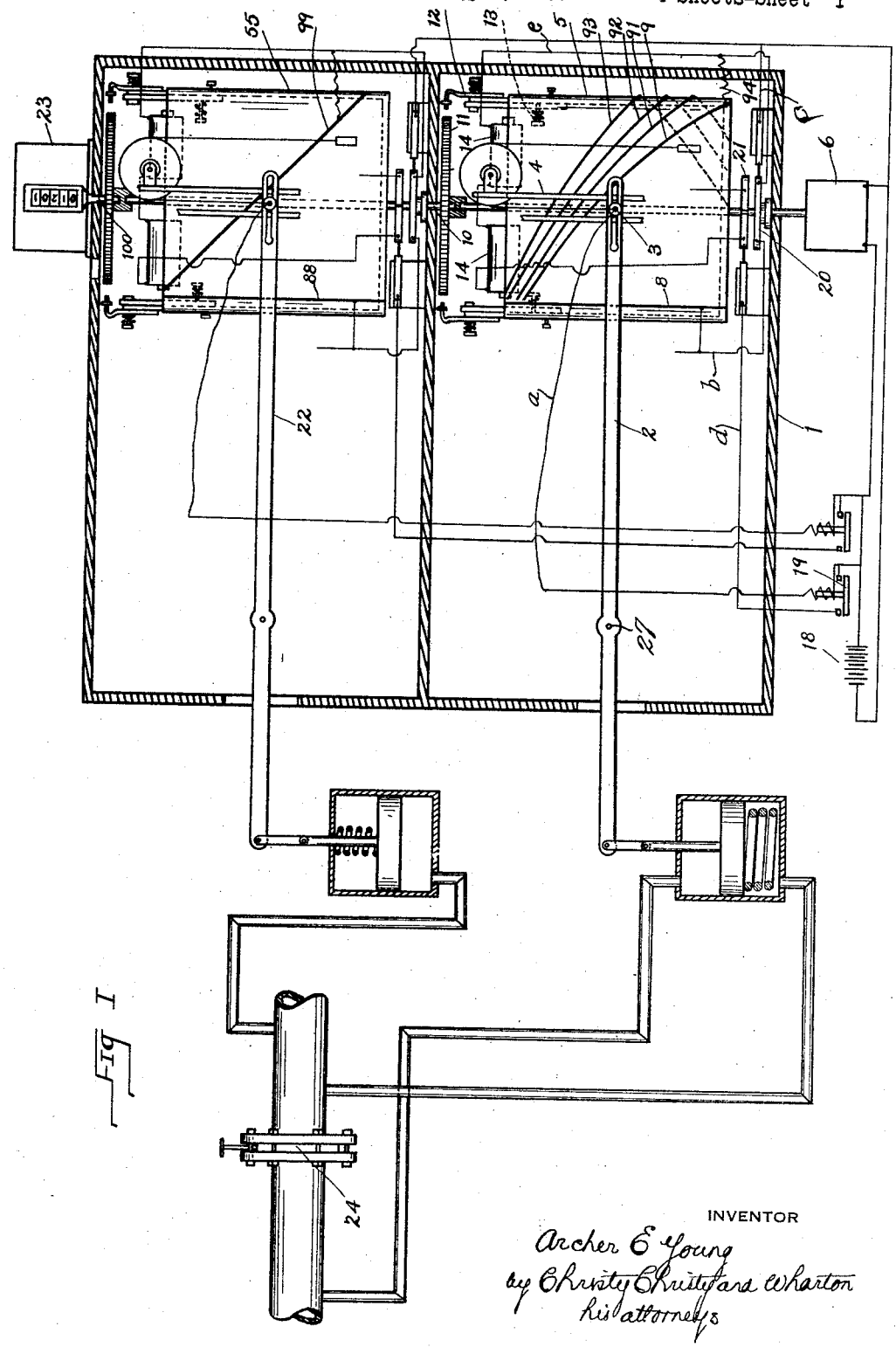
Fig I
INVENTOR
Archer E Young
by Christy Christy and Wharton
his attorneys

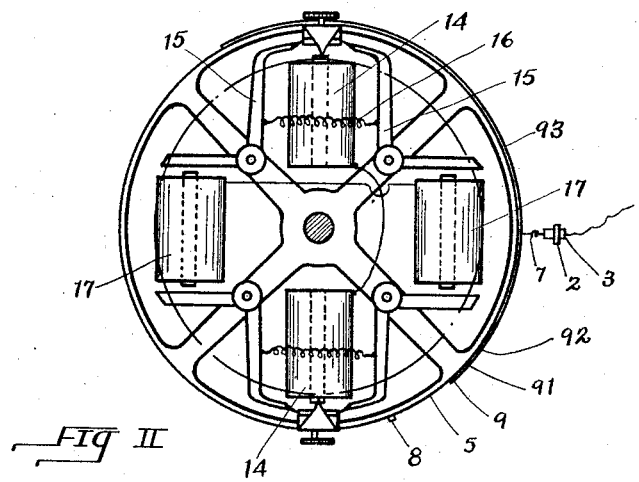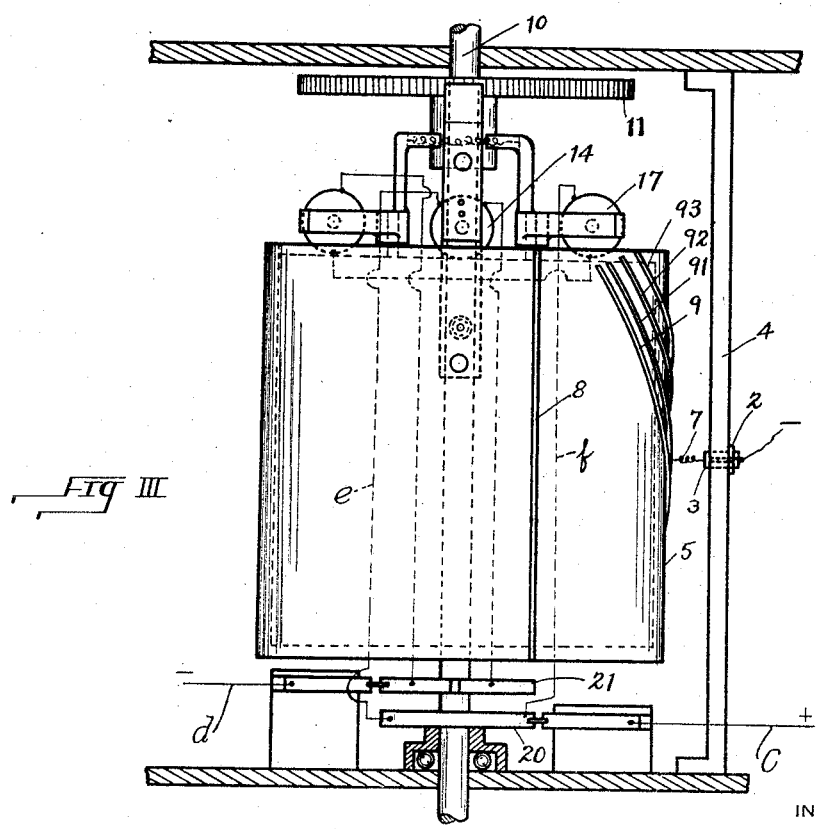

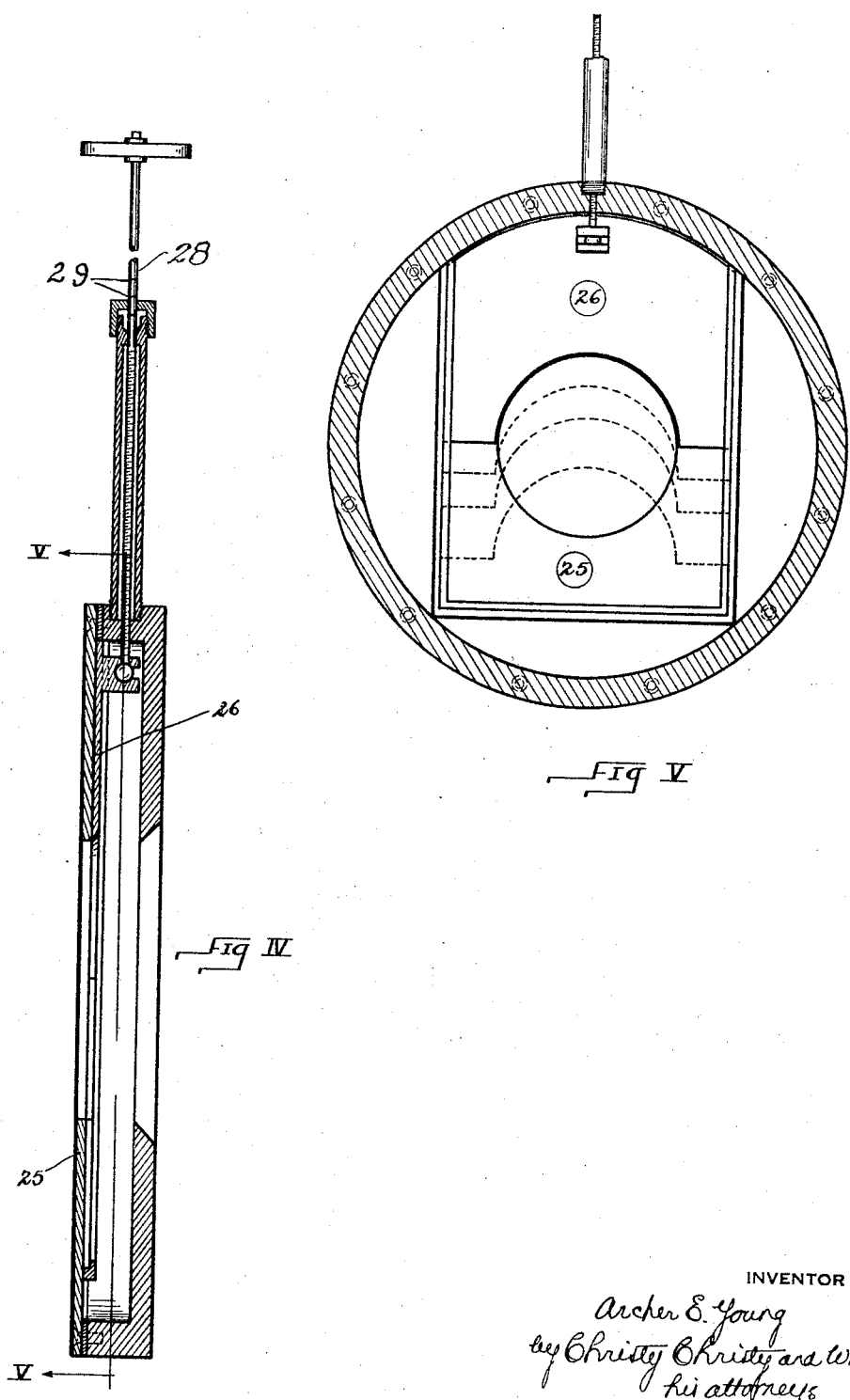

Dec. 13, 1932.  A. E. YOUNG  1,891,035
MEASURING APPARATUS
Filed May 6, 1930   4 Sheets-Sheet 4
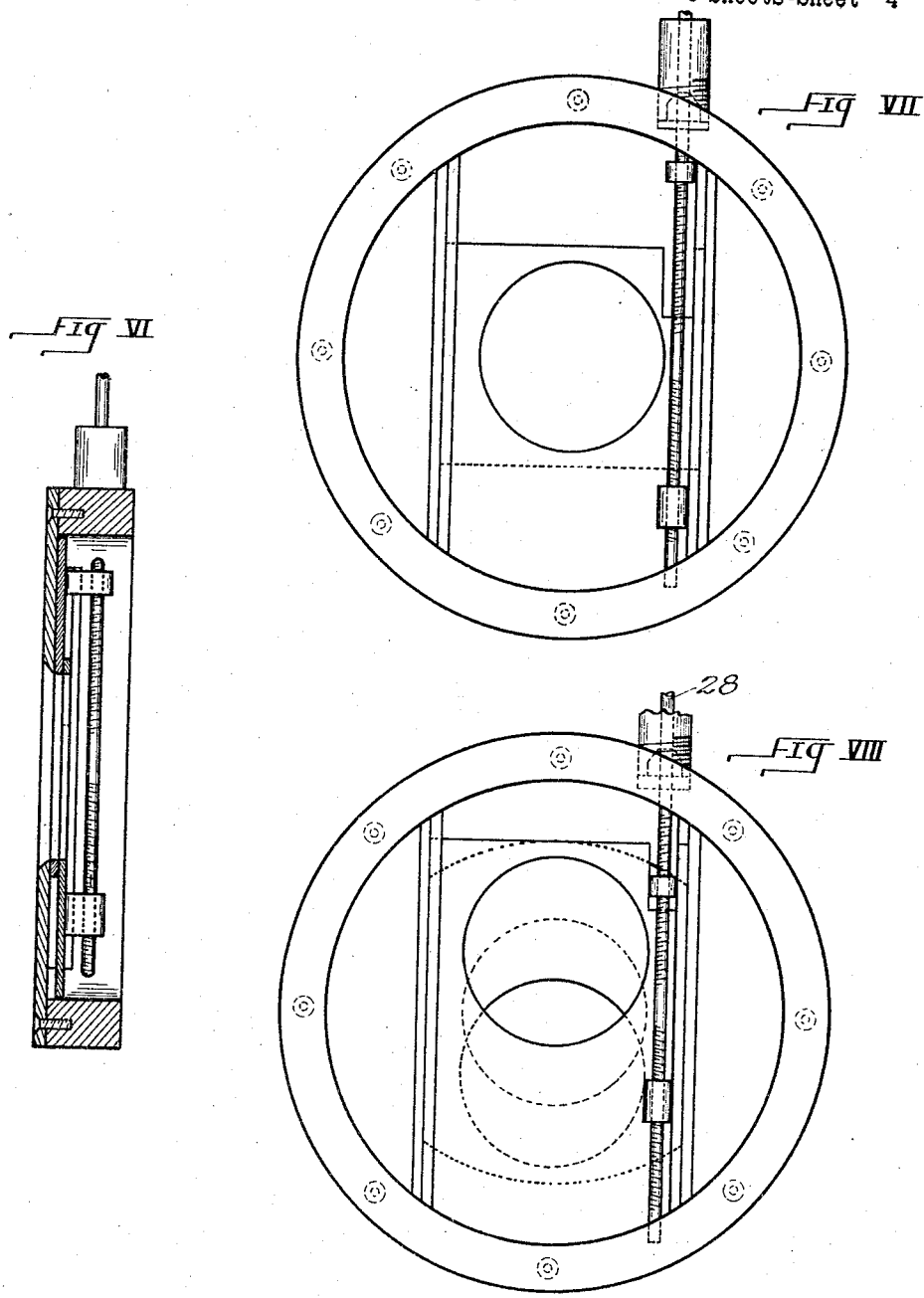
INVENTOR
Archer E. Young
by Christy Christy and Wharton
his attorneys Patented Dec. 13, 1932

1,891,035

UNITED STATES PATENT OFFICE

ARCHER E. YOUNG, OF PITTSBURGH, PENNSYLVANIA

MEASURING APPARATUS

Application filed May 6, 1930. Serial No. 450,115.

My invention relates to orifice meters, and consists in apparatus which shall afford direct reading in units of volume of the quantity of gas passed, with correction for variations in pressure. Under ordinary field conditions there may be such variation in the rate of flow of gas through the main as to necessitate change in the size of the orifice; to the end that, under all the range of rate of flow, there shall be differential pressure sufficient to operate the measuring apparatus with substantial accuracy.

In the accompanying drawings Fig. I is a view in vertical section of an instrument embodying my invention and adapted to afford by direct reading in units of volume the quantity of gas flowing through an orifice in a gas main; Fig. II is a view to larger scale, showing in end elevation one of the rotary members which form part of the organization; Fig. III is a fragmentary view in section, to the same scale with Fig. II, and showing in side elevation the same rotary member, with greater elaboration of detail than appears in Fig. I; Fig. IV is a view to still larger scale, showing in vertical section, and in the plane with which the axis of the conduit coincides, the orifice plate in its mounting; Fig. V is a view in vertical section, in a plane at right angles to that of Fig. IV, of the mounting for the orifice plate, and showing the plate itself in elevation. The plane of section of Fig. V is in Fig. IV indicated by the line V—V. Fig. VI is a view corresponding to Fig. IV and illustrating a modification; and Figs. VII and VIII are views in front elevation of the orifice-plate structure in the modified form of Fig. VI, and showing the plate itself in different operative positions.

Referring first to Fig. I of the drawings, a casing 1 is provided, within which at 27 a long lever 2 is pivoted. This lever 2 is organized, as diagrammatically indicated in Fig. I, with an orificed plate in a gas main, in such manner that it swings in response to variation in the "differential pressure"—that is to say, in the pressure-drop from the upstream side to the down-stream side of the orifice. Such elementary organization is well known, and requires no further illustration. It has, as I have already intimated, long been common practice to observe the range of swing of such an arm and, observing also by other particular means variations in the "static pressure"—that is to say in the actual pressure to which the gas stream is subject—to calculate the quantity of gas which during the time of observation actually passes through the orifice. Such procedure is complicated and time consuming and, though theoretically capable of affording accuracy, is subject to the practical difficulty of ascertaining with accuracy what the variations in actual pressure may be. And, in passing, I remark that in my apparatus there is the possibility of such minute shaping of the parts that each instrument may by reference to a normal be standardized, to afford under all conditions within the range of contemplated service substantially perfect accuracy.

The lever 2 at its distal end is slotted longitudinally and carries freely reciprocable in the slot a block 3. Block 3 is engaged also by a guideway 4 which extends transversely to the length of arm 2. As the arm 2 swings in response to variation in the differential pressure of the gas flowing through the orifice, block 3 will move up and down in guideway 4, and, the arm 2 being relatively long and being so organized that within the limits of ordinary operation its angular range of swing is small, the movement of block 3 along the guideway will always be closely proportional to the variation in differential pressure. If it were a matter of direct reading of the position of the block along the guideway, the inaccuracy, due to the fact that the right-line movement of the block is not minutely proportional to the angular swing of the lever, would be inconsiderable; but, by virtue of the fact that the block cooperates with other mechanical parts, proportions may be so far modified and adapted as to eliminate even such a slight and inconsiderable inaccuracy.

In proximity to, and in parallelism with the movement of block 3 in its guideway, extends a constantly and uniformly advancing surface. In the particular instrument here illustrated, this surface is the surface of a cylinder 5, mounted for rotation on an axis parallel with the pathway of block 3 and rotated at constant speed by suitable means, in this case the motor 6. The block 3 is equipped with a brush 7 (cf. Figs. II and III) and the surface of the cylinder is provided with areas of contact so disposed that cylinder rotation will effect the periodic making and breaking of an electric circuit or electric circuits. Conveniently, the cylinder surface, otherwise non-conducting carries strips 8 and 9 of conducting material. Strip 8 extends longitudinally upon the surface of the cylinder and parallel with its axis, and strip 9 is so particularly shaped and disposed that at successive points longitudinally of the cylinder the distance between the strips, measured circumferentially, is proportional to the square root of the differential pressure to which block 3 in its movement is responsive. With reference to the instrument of the drawings, the strip 9, being prolonged, would meet the strip 8 at or near the upper end of the cylinder. When the differential pressure in the gas main is zero, there is of course no flow; and, while that condition obtains, the lever 2 is in a position upwardly inclined from left to right, and the brush 7 which block 3 bears is just free of contact with the strips at their meeting point. As the differential pressure increases from zero through the range of service value, the lever 2 swings clockwise, and the block 3 moves from the zero point downward along the guideway 4; and at successive points in the range of block movement, the distance between the strips, measured circumferentially, is proportional to the square root of the differential pressure to which block 3 in its movement is responsive. It will be understood that in this respect the drawings are diagrammatic; no attempt has been made so to plot the position of strip 9 as to render the drawing a literal presentation of the equation stated.

A shaft 10 is mounted for rotation coaxially with cylinder 5. Shaft 10 carries integrally a clutch member, in the form of a disk 11. Cylinder 5 carries one or more clutch members, in the form of swinging arms 12 which extend longitudinally beyond the head of the cylinder and opposite the face of disk 11. The arms may be swung to and from engagement with the disk. The face of the disk and the outer ends of the arms are suitably adapted to serve the clutch purpose indicated. To such end, the face of the disk may be serrated, and the arms may terminate in teeth adapted to enter and to be withdrawn from engagement with the serrations. Such minute shaping of the parts is indicated in the drawings. Conveniently there are two arms 12, arranged in diametrically opposite positions on cylinder 5. Normally the arms 12 are held by springs 13 in the retracted position indicated in Fig. I, and from this position they are swung inwardly, against the tension of the springs, by means of electromagnets 14. These magnets are borne by cylinder 5 and are so situated that, when energized, they attract and draw the arms inward; and, to effect this end, the arms are formed of magnetic material, or carry blocks of magnetic material suitably situated.

Cooperating with the arms 12 are spring latches 15, borne also by cylinder 5. When, by the energizing of electro-magnets 14, the arms 12 are swung inward to clutch-closing position, the latches, which under the tension of springs 16 had been bearing laterally upon the sides of the arms, spring to place behind the arms, and hold them secure in their clutch-closing position.

A second pair of electro-magnets 17 is provided, borne also by cylinder 5, and so arranged that, when energized (in alternation with the energizing of magnets 14), they will be effective to swing the latches 15, against the tension of springs 16, from the latching position to which in consequence of the action of electro-magnets 14 they had swung, to unlatching position; and then the arms 12, freed of restraint, swing again, under tension of their springs 13, back to the position of clutch release.

By such provision, shaft 10 is caused to rotate in union with the clock-driven cylinder 5, so long as the clutch is closed. When the clutch is open, shaft 10 is at rest.

The parts of the electrical apparatus are diagrammatically shown: 18 is a suitable source of electrical energy; 19 is a relay; 20 and 21 are collector rings borne by and insulated upon the rotating shaft of cylinder 5. The ring 20 is complete and continuous; the ring 21 is composed of two arc-shaped parts, insulated one from the other. The wiring, the contact blocks, and brushes do not require detailed enumeration. It should, however, be remarked of collector ring 21 that one portion is electrically connected with the coils of magnets 14, and the other portion with the coils of magnets 17.

When in the course of cylinder rotation the brush 7 with which block 3 is equipped makes contact with strip 8, a circuit of relatively high resistance is completed from source 18 through the coil of relay 19, lead $a$, strip 8, lead $b$, ring 20, lead $c$, and back to the source again. Relay 19 then is operated, and then immediately a circuit of relatively low resistance is completed from source 18 through lead $d$, ring 21, magnets 14, lead $e$, ring 20, lead $c$, and back to the source again. The current flowing in full strength through magnets 14, energizes them, and closes the clutch. The latches 15 automatically close under the tension of springs 16 behind the clutch arms 12. The electro-magnets 14 having performed their part in the operation become de-energized by the opening of relay 19 when the brush borne by block 3 advancing breaks contact with strip 8. The clutch, however, remains closed, secured by latches 15. The shaft 10, which up to the moment of contact had been at rest, from that moment forward rotates in unison with the cylinder. In the further progress of operation the brush with which block 3 is equipped makes contact with strip 9, and a circuit of relatively high resistance is first closed from source 18 through the coil of relay 19, lead $a$, strip 9, lead 94, ring 20, lead $c$, and back to the source again. Relay 19 then is operated, and a circuit of relatively low resistance is closed from source 18 through lead $d$, ring 21 (now so turned as to present to the circuit-completing parts the other of its two arc-shaped strips of conducting material), magnets 17, lead $f$ (cf. Fig. III), ring 20, lead $c$, and back to the source again. This circuit is closed, not through electro-magnets 14, but, because of the turning of ring 21, through electro-magnets 17. The energizing of magnets 17 effects the opening of the latches 15, and in consequence the clutch arms 12, released from restraint, swing outward under spring tension, the clutch is opened, and the shaft 10 stops.

The purpose of the relay 19 is to prevent sparking, as the brush 7 makes contact with strips 8 and 9.

It will be perceived that with every rotation of the cylinder 5 the shaft 10 turns through a fraction of a complete rotation, and that the value of that fraction will be greater or less, according to the circumferential distance between the strips 8 and 9 at the point at which the longitudinally movable block 3 stands. That distance, as has been explained, is approximately proportional to the square root of the distance at which block 3 stands from zero; that is to say, it varies as the square root of the differential pressure under which the gas is flowing through the orifice. The extent of rotation of the shaft 10 then within the fixed time interval of one complete rotation of cylinder 5 is an exponent of the quantity of gas which in that interval of time has passed through the orifice. It will be apparent that if a tally were driven by shaft 10, a suitable proportioning of parts (which might readily be done) would suffice to afford a reading in terms of volume of the quantity of gas passed—uncorrected, however, for variations in other circumstances.

Under field conditions, not only does the differential pressure vary in a flowing stream of gas, but the static pressure varies too; and, other things being equal, the quantity of gas passing varies as the square root of the static pressure. It is common, in the practical measurement of gas, to obtain volumetric measurement, corrected more or less perfectly for variations in differential pressure, to observe by other means the variations in static pressure, and then to make correction of the first-named measurement by calculation from the observed value of the static pressure. I have perceived that, not only may I employ a device, the duplicate of that already described, to express in angular extent of the turning of a shaft, and with correction for variations in static pressure, the quantity of gas which in a given interval of time passes an orifice, but I have further perceived that if I mount the cylinder of such a second device upon the driven shaft of the first, then the driven shaft of the second device will turn through an angle which in the constant interval of time of one revolution of cylinder 5 will be indicative of the quantity of gas passed, with correction for variations both in differential and in static pressure.

Turning again to Fig. I of the drawings, a second device, essentially identical with that already described, will be seen to be mounted upon the first; the cylinder 55 of the second will be understood to be carried integrally upon the driven shaft 10 of the first. The lever 22 of the second device may be understood to swing in response to variation in the static pressure of the gas flowing in the main; and the arrangement of the contact strips 88 and 99 upon the cylinder of the second device may be understood to be such that for each rotation of drum 55 the shaft 100 turns through an angle which varies in value, proportionately to the square root of the value of the static pressure. When the two devices are so organized, the shaft 100 will turn through an angle whose value will be indicative of the quantity of gas passed, with correction for variations both in differential and in static pressure. If then shaft 100 be caused to drive a tally 23, it is merely a matter of proportioning of parts to obtain direct reading of the so corrected value.

In Fig. I, I show at 24 the position of the orifice plate in the gas main. Under varying conditions of flow, the varying differential pressure is maintained within a range adequate to the proper operation of the measuring apparatus which, in its essential features, is described above. Referring to Figs. IV and V, the orifice will be seen to be formed by and between a circular opening in plate 25 and a semi-circular recess in the margin of plate 26. The plate 26 is adjustable vertically, to the end that the effective orifice may vary in size and shape from a full circle to a lune of diminishing dimensions. It is advantageous to arrange plate 26 to move in a guideway formed by flanges upon one side of plate 25, and to operate plate 26 by a screw extending through a packing gland, as shown in Fig. IV. Figs. VI, VII, and VIII show that, by making both plates movable and by forming in both circular openings and by mounting the plates for simultaneous adjustment upon a rotatable screw-threaded rod 28, the orifice whatever its size, may be maintained always centered in the conduit. The invention is not, in its broader aspect, limited to any particular shape of orifice nor to any particular means for effecting adjustment in the effective size of the orifice; the invention in its broader aspect contemplates an orifice of adjustable size, and the drawings show with some variety in detail means for providing adjustability in size of the orifice. Any suitable expedient may be adopted by which the attendant may determine precisely the exact positions to which the movable plate or plates are brought; for example, the adjusting rod 28 may be provided with marks 29 indicative of plate position.

As the rate of flow diminishes the effective size of the orifice is decreased, and to each orifice size the contact strip 9 on the cylinder 5 must in its minute placement be adjusted, in order to afford accurate mensuration. For all practical purposes, with such an orifice as the apparatus of Figs. IV and V affords, four particular positions of plate 26 (the full-line position, and the three dotted-line positions) will suffice. The strip upon cylinder 5 to which the numeral 9 is immediately applied may be understood to be the strip so placed as to afford accurate measurement when the plate 26 is in the full-line position of Fig. V and the whole circle of plate 25 is uncovered; and the successive strips 91, 92, and 93 may be understood to be severally so placed as to afford accurate measurement when the plate 26 is shifted and brought to the successive dotted-line positions of Fig. V. A movable contact, shown as a jumper-wire 94, is provided to bring one or another of the strips 9, 91, 92 and 93 into the magnet-operating circuit already described, as the attendant may choose. When the orifice is wide open, the jumper-wire, in the position shown in Fig. I, brings strip 9 into circuit; and, as the plate 26 is shifted to its successive positions, the jumper-wire is shifted, to close the circuit through strips 91, 92, or 93; and in each case, in consequence of proper placement of the strip, the operation already described is carried out with accuracy. Engagement of brush 7 with the strips will be effective, only in the case of that strip with which the jumper-wire 94 happens at the time to be in circuit-completing contact.

The hydraulic formula for measuring gas passing a constriction in a pipe line, like an orifice plate with an opening in it considerably less than the cross-section of the pipe, may be written—

$$Q = CE\sqrt{HP}$$

in which C is a constant whose value depends on the size of the orifice opening, the units of measure used, etc.

H is the difference between the pressures on the upstream and downstream sides of the plate, and hence changes in value with change in velocity of flow of the gas, measured, generally, in inches of water, P is the static pressure (in pounds absolute) of the gas as it passes the opening in the plate, and hence is also changing its value with the time, Q is cubic feet of gas passed per hour, say, and E is a number (generally considered as a constant for a given sized orifice in a given pipe-size), whose value is determined by dividing the actual gas flow through such a plate by the theoretical flow, that is the flow one would get by the above formula when E was replaced by 1. The values of E, as thus determined for different sized plates in different sized lines, have been determined by "holder experiments"; that is to say, by passing the gas through an orifice plate into a tank or holder and there measuring it by considering the volume it occupies, its pressure, etc.

The experiments of the past five years for the American Gas Association, all dealing with the orifice meter, show that the value of E above, as found by experiment, is not actually constant for a given sized plate in a given sized line, but actually varies with the rate of flow of the gas through the plate, and is also affected by the departure which in practice is found from the theoretical statement known as Boyle's law of compressibility.

In other words I would say (and such, in fact, is my recommendation), that the hydraulic formula given above be replaced by the following—

$$Q = Cf(H)\sqrt{HP}$$

in which E has been replaced by $f(H)$, to show that its true value changes with and depends on the value of H.

If the variation of P is not too great, the change of E with change of P can be ignored.

In the immediately foregoing discussion the assumption is that the hole in the orifice plate is circular and that its center is at the center of the pipe.

In the use of means for adjusting the effective area of the orifice, to suit change in magnitude of flow, it will in many cases be found that the change of flow is periodic, the maxima and minima occurring at certain hours of the day. In other cases it is seasonal, changing with change of temperature, and hence with the demand for gas.

Attempts have been made to design an orifice set-up that will permit change of orifice without opening up the pipe line, and I have described above an arrangement effective to that end.

If the opening in the plate could be kept circular as it was closed and opened, as in the case of the iris diaphragm of an optical lens, all would be well, and in such case the formula given above could be used, changing the value of C only, as the opening changed in size. But this is not practical.

I perceived that if I were to employ such a variable orifice structure as I have described, I might formulate an equation for the quantity of gas passing the orifice, thus—

$$Q = Cf(H) F(P) \sqrt{HP}$$

in which E of the first formula given above has been replaced by $f(H) F(P)$, in which $f(H)$ is a function of the differential pressure and $F(P)$ is another function of the static pressure, and in which the values of $f(H)$, for every orifice opening, under a substantially constant static pressure, is determinable by test. For successive values of H, under a given static pressure, I determine the values of the expression $f(H)$. The theoretical position of strip 9 upon the cylinder is such that at every point longitudinally of the cylinder the distance between the two strips 8 and 9 circumferentially is equal to the square root of the distance of that point from the zero at which the two strips, if prolonged, would meet; that theoretical position is modified by the test indicated.

For each orifice opening the strip 9 (91, 92, 93) is placed by test.

The instrument so built will be accurate when working within a substantial range of static pressure. When operation must be had under wider ranges of static pressure, two provisions are available: (1) to provide a plurality of interchangeable cylinders 5, each provided with a set of strips which has in the manner indicated been laid down to suit a particular range of static pressure and which by substitution may cover the whole range of practical variability; (2) to provide a plurality of interchangeable cylinders 55, with the desired capacity for correction in the particular placement of the strip 99. Three or more particular ranges in the value of static pressure may, as a practical matter, thus be provided for: (1) a range of 25 to 50 pounds; (2) a range of 50 to 100 pounds; (3) a range of 100 to 150 pounds, etc.

I claim as my invention:

1. In apparatus for measuring gas flowing in a main, the combination, with a gas main, an orifice structure of variable aperture arranged in the main, and means for bringing the orifice structure to one or another of a plurality of alternate positions, of a rotary cylinder; a second rotatable member; and means for transmitting rotation from the said cylinder to the said second rotary member; such rotation-transmitting means including a clutch and means for rendering the clutch effective during a greater or less portion of the period of cylinder rotation, as the differential pressure across the orifice in the main varies; the means last named including an electric circuit, a plurality of contact pieces, one for each orifice position, borne by and circumferentially spaced upon the said cylinder, together with means for bringing into such circuit at will one or another of the said contact pieces.

2. In apparatus for measuring gas flowing in a main, the combination, with a gas main, an orifice structure of variable aperture arranged in the main, and means for bringing the orifice structure to one or another of a plurality of alternate positions, of registering mechanism including a rotary cylinder; a second rotatable member; a tally; rotation-transmitting mechanism interposed between the cylinder and the second rotatable member, such rotation-transmitting mechanism including a clutch, and means for rendering the clutch effective during a greater or less portion of the period of cylinder rotation, as the differential pressure across the orifice in the main varies, the means last named including an electric control circuit, a plurality of contact pieces, one for each orifice aperture, borne by said rotary cylinder, and spaced apart circumferentially upon the cylinder, together with means for bringing one or another of such contact pieces at will into the said circuit; and rotation-transmitting mechanism interposed between the said second rotatable member and the said tally, the last-named rotation-transmitting mechanism including a clutch, and means for rendering the last-named clutch effective during a greater or less portion of a period of cylinder rotation, according to variation in the static pressure of the gas flowing in the main.

3. In gas-measuring apparatus, and in combination with a gas main, an orifice structure arranged in the main, including two diametrically movable slides, together with means for effecting their simultaneous movement, whereby the effective orifice may within the range of movement be maintained in one or another of a plurality of positions, a constantly moving member, a block movable along a pathway transverse to the direction in which the said member moves, means for causing the said block to move along such pathway in response to variation in the differential pressure in the stream of gas flowing in the said main and through such orifice, the said movable member being provided with a plurality of contact pieces, one for each orifice position, spaced apart in the direction in which the said member moves, the said block being provided with a cooperating contact piece, a second movable member, and means for transmitting motion from the said constantly moving member to the said second movable member, the said means being subject to electric control, and a control device including an electric circuit in which is included the block-borne contact piece, together with means for bringing into such circuit, at will one or another of the contact pieces with which the movable member first named is provided.

4. Apparatus for measuring gas including, in combination with a gas main, an adjustable orifice structure within the main, means for adjusting the said structure in one or another of a plurality of positions, of a constantly moving member, a block movable along a pathway transverse to the direction in which the said member moves, means for causing the said block to move along such pathway in response to variation in the differential pressure in the stream of gas flowing in the said main and through such orifice, the said movable member being provided with a plurality of contact pieces, one for each orifice position, spaced apart in the direction in which the said member moves, the said block being provided with a cooperating contact piece, a second movable member, means for transmitting motion from the said constantly moving member to the said second movable member, the said means last named being subject to electric control, and a control device including an electric circuit and means for bringing into such circuit at will one or another of the said contact pieces, the said parts being so arranged that as the said constantly moving member moves the circuit is closed by engagement of the said block-borne contact piece with that one of the member-borne contact pieces with which the means last defined are operative.

5. Apparatus for measuring gas including, in combination with a gas main, an orifice structure arranged in the said main, such orifice structure including a movable member by the movement of which an effective orifice of one or another of a plurality of sizes may be established, a constantly rotating member, a block movable along a pathway transverse to the direction in which the said member rotates, means for causing the said block to move along such pathway in response to variation in the differential pressure in the stream of gas flowing in the said main and through such orifice, the said rotary member being provided with a plurality of circumferentially spaced contact pieces, one for each orifice size, and the said block being provided with a cooperating contact piece, a second rotary member, and movable means for imparting rotation from the said constantly rotating member to the said second rotary member, means for effecting movement of the means last named to and from rotation-imparting position, such movement-effecting means including an electric circuit, and means for bringing at will into such circuit one or another of the contact pieces with which the said constantly rotating member is provided, the said parts being so arranged that as the said constantly rotating member advances the circuit is closed by engagement of the block-borne contact piece with that one of the member-borne contact pieces with which the means last defined are operative.

In testimony whereof I have hereunto set my hand.

ARCHER E. YOUNG.